(12) United States Patent
Belair et al.

(10) Patent No.: US 7,162,476 B1
(45) Date of Patent: Jan. 9, 2007

(54) SYSTEM AND METHOD FOR SHARING GLOBAL DATA WITHIN DISTRIBUTED COMPUTING SYSTEMS

(75) Inventors: Stephen Belair, Santa Cruz, CA (US); David Delano Ward, Somerset, WI (US)

(73) Assignee: Cisco Technology, Inc, San Jose, CA (US)

( * ) Notice: Subject to any disclaimer, the term of this patent is extended or adjusted under 35 U.S.C. 154(b) by 123 days.

(21) Appl. No.: 10/660,380

(22) Filed: Sep. 11, 2003

(51) Int. Cl.
*G06F 17/00* (2006.01)

(52) U.S. Cl. .......................................... 707/10; 707/2
(58) Field of Classification Search ................ 707/3, 707/4, 5, 6, 10, 2; 709/213; 711/202, 203
See application file for complete search history.

(56) References Cited

U.S. PATENT DOCUMENTS

| | | | |
|---|---|---|---|
| 5,918,229 A * | 6/1999 | Davis et al. ................... | 707/10 |
| 5,987,506 A * | 11/1999 | Carter et al. ................. | 709/213 |
| 6,026,474 A * | 2/2000 | Carter et al. ................. | 711/202 |
| 6,263,414 B1 * | 7/2001 | Itzkovitz et al. ............. | 711/203 |

OTHER PUBLICATIONS

Chen et al., MultiJav: A Distributed Shared Memory System on Multiple Java Virtual Machines, 1998, Utah State University, pp. 1-7.*
Dreier et al., The Rthreads Distributed Shared Memory System, Institute of Informatics, 1999, pp. 1-7.*
Carter, John B., et al., "Implementation and Performance of Munin", *Operating Systems Review—A Quarterly Publication of the Special Interest Group on Operating Systems*, Proceedings of the Thirteenth ACM Symposium on Operating Systems Principles vol. 25, No. 5,(Oct. 13, 1991),152-164.
Iftode, Liviu , et al., "Scope Consistency: A Bridge between Release Consistency and Entry Consistency", *Department of Computer Science, Princeton University*, (1996),277-287.
Radovic, Zoran , et al., "Removing the Overhead from Software-Based Shared Memory", *Uppsala University, Information Technology Department of Computer Systems*, (Nov. 2001),1-13.
Speight, Evan , et al., "Brazos: A Third Generation DSM System", *Department of Electrical and Computer Engineering, Rice University*, Proceedings of the 1997 USENIX Windows/NT Workshop,(Aug. 1997),1-12.
Speight, William E., "Efficient Runtime Support for Cluster-Based Distributed Shared Memory Multiprocessors", *A thesis submitted in partial fulfillment of the requirements for the degree. Doctor of Philosophy*, Houston, Texas,(Aug. 1997),1-143.

* cited by examiner

*Primary Examiner*—Apu M. Mofiz
(74) *Attorney, Agent, or Firm*—Schwegman, Lundberg, Woessner & Kluth P.A.

(57) ABSTRACT

A system and method for sharing data within a distributed computing system having a plurality of nodes, wherein each node includes a processor and memory. An application is distributed across two or more nodes, including a first node, wherein distributing the application includes creating application processes, associating the application processes with a group and distributing the application processes to the first and second nodes. A data object is established in memory on the first node, wherein defining a data object includes allocating memory for the data object. A name is assigned to the data object and the name is mapped to a data object handle. Data within the data object is accessed through references to the data object handle.

63 Claims, 6 Drawing Sheets

SYSTEM AND METHOD FOR SHARING GLOBAL DATA WITHIN DISTRIBUTED COMPUTING SYSTEMS

FIELD OF THE INVENTION

The present invention is related to data sharing, and more particularly to a system and method for sharing global data within distributed computing systems.

BACKGROUND INFORMATION

It is becoming increasingly practical to build computing platforms based on a set of microprocessors distributed as nodes in a loosely coupled multiprocessor system. In one approach, system memory is distributed among the nodes and directly accessible only by the processor or processors on that node.

Applications for such systems are difficult to develop. In order to use the computing power of two or more nodes, the applications must be capable of being executed as processes distributed across the nodes. Data acted on by these processes must be stored in such a way that processes operating on other nodes can access that data.

Distributed shared memory systems have been described which map physical memory on each of the nodes to a global virtual memory space. Distributed Shared Memory (DSM) runtime systems, for instance, transparently intercept user accesses to remote memory and translate those accesses into messages appropriate to the underlying communication media. The programmer is thus given the illusion of a large global address space encompassing all available memory, eliminating the task of explicitly moving data between processes located on separate machines. William E. Speight and John K. Bennett describe such systems in *Brazos: A Third Generation DSM System*, published August 1997 in *Proceedings of the 1997 USENIX Windows/NT Workshop*, the description of which is incorporated herein by reference.

Such an approach can be difficult to implement and inflexible, especially when applied across a heterogeneous group of nodes. DSM systems are usually implemented through memory management unit (MMU) semantics, with the shared virtual address range implemented through MMU mappings. The runtime system coordinates accesses to shared data and keeps shared data consistent across nodes by managing the mappings to the shared virtual address range.

Because of the MMU support, however, the size of data being shared is limited by the granularity of the page size, as well as by the cache policy. There are two drawbacks of these limitations: false sharing and lack of flexibility in assigning coherency semantics to data from different applications that falls within the same page.

Another approach to sharing data within distributed computing systems is to treat memory on each node as independent memory space, and use message passing to share data. In one such approach, the system defines a data item and assigns to that data item a name that is unique across the system. Subsequent references to that data item result in explicit message passing between nodes to obtain the latest instance of the data item. Such an approach can lead to excessive communication costs; messages are sent to all parties involved in sharing the data item for every reference to data within that data item.

What is needed is a system and method for sharing global data within distributed computing systems that addresses the issues raised above and others that will become apparent in reading the following description of the present invention.

SUMMARY OF THE INVENTION

The present invention is a system and method for sharing data within a distributed computing system having a plurality of nodes, wherein each node includes a processor and memory. An application is distributed across two or more nodes, including a first node, wherein distributing the application includes creating application processes, associating the application processes with a group and distributing the application processes to the first and second nodes. A data object is established in memory on the first node, wherein defining a data object includes allocating memory for the data object. A name is assigned to the data object and the name is mapped to a data object handle. Data within the data object is accessed through references to the data object handle.

BRIEF DESCRIPTION OF THE DRAWINGS

In the drawings, like numerals describe substantially similar components throughout the several views. Like numerals having different letter suffixes or primed (X') represent different occurrences of substantially similar components.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description and claims, the terms "coupled" and connected," along with their derivatives, may be used. It should be understood that these terms are not intended as synonyms for each other. Rather, in particular embodiments, "connected" may be used to indicate that two or more elements are in direct physical or electrical contact with each other. However, "coupled" may also mean that two or more elements are not in direct contact with each other, but yet still co-operate or interact with each other.

Figure 1:
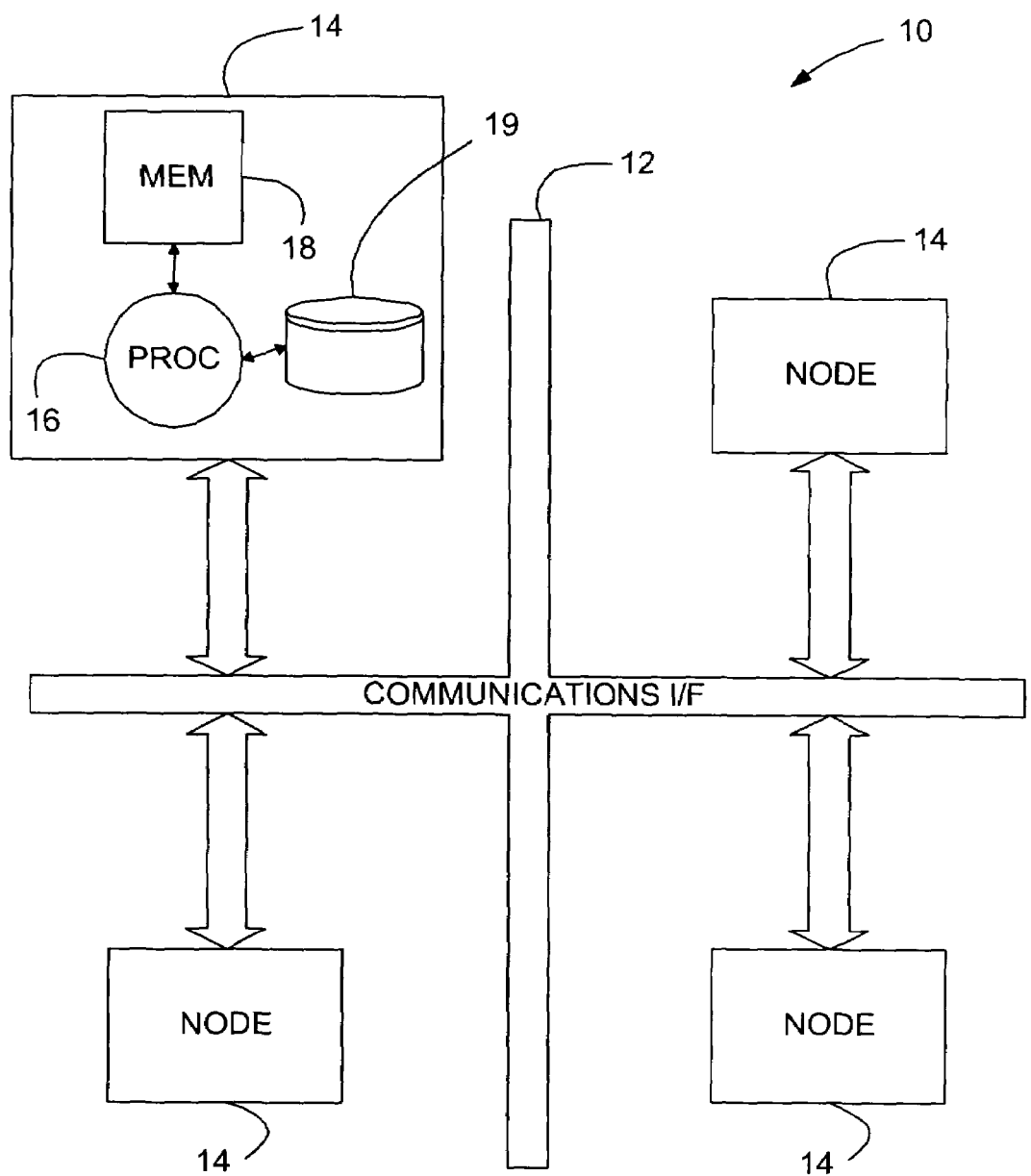
FIG. 1 is a schematic diagram of a data distribution system in accordance with the present invention.

A distributed computing system 10 is illustrated in FIG. 1. System 10 includes nodes 14 connected by communications interface 12. In the embodiment shown, each node 14 includes a processor 16 connected to memory 18. As noted above, memory in distributed computing system 10 is distributed among the nodes 14 and directly accessible only by the processor or processors 16 on that node.

In one embodiment, communications interface 12 includes a switch fabric for high-speed communication between nodes 14. In other embodiments, communications interface 12 is a bus or other such communications medium.

In one embodiment, one or more nodes 14 includes a computer readable medium 19 used to store program instructions for implementing aspects of the present invention.

In one embodiment, system 10 employs a group communications infrastructure to communicate between processes distributed to different nodes 14. The group communications infrastructure provides a collective identity to a distributed set of processes. That is, the distributed processes have a collective identity as a group and thus appear as a single application to a process outside of the group.

System 10 treats memory on each node as independent, and uses message passing to share data. Please note that, in contrast to distributed shared memory systems, there is no address that can be used to access data within a shared virtual memory. Instead, objects are accessed by explicit reference to their names.

To do this, system 10 defines a data item and assigns to that data item a name that is unique across the system. System 10 then maps each data item to be shared to a unique and global handle. Distributed Data Management (DDM) then attempts to treat the sharing of data as a pseudo-DSM problem and to apply the optimizations available to DSM systems to reduce the messages required to share global data and thereby reduce the costs of such sharing.

In the DDM approach, it is possible for group members to introduce data to be shared among the rest of the group—data is thus "exported". The data object to be shared is known globally by its unique name. In one embodiment, the name of the object to be shared is mapped to a handle by a mapping service. In one such embodiment, both the name of the data object and the handle must be globally unique.

Once this mapping is performed, all DDM-related activity is on the handle and the name is no longer referenced. In fact, if another member in the system wants to access shared (exported) data, it must consult the mapping service—it will pass in its name of the shared item and get back the handle.

In one such embodiment, the data object handle is opaque. That is, one can not infer from the handle anything about the data which the handle represents. All that is required is that the data object handle uniquely represent one data item, that it be globally assigned, and that all references to the shared data name be replaced by references to the data object handle.

What has been accomplished, then, is that the sharing of the data in the system has been mapped to the sharing of handles in the system. Furthermore, the transformation of the problem into the handle domain effectively allows one to treat the sharing of the data as a DSM problem, for the space of handles can be viewed as a shared virtual address range. That is, the space of all handles can be constructed through the union of all handles, along with the length of data associated with each handle. In this view, then, a shared data item associated with handle H and length L will have an segment in the handle space starting at H and extending through H+ L. Furthermore, all references to "addresses" between (H, H+ L) are taken as references to the data item described by handle H.

Therefore, through the essential transformation of mapping the sharing from a name-space domain into shared handle domain, the sharing can be treated as a sharing of data within a virtual address domain.

DDM therefore creates a shared virtual address space in which to manage the sharing of discrete data. Since the system is initially not a distributed shared memory system, the created shared virtual address range may be artificial in that it may not represent a virtual address range that is really accessible to the processors in the system, or it may actually be a viable virtual address range.

To summarize, the transformation is accomplished, first, by mapping the name of an object to a unique and global handle; and, second, by treating the handle as a shared virtual address. The starting address of the shared object is the handle, and it extends to the starting address plus the size of the data object being shared. With this transformation, traditional optimizations available to distributed shared memory systems can be applied.

Furthermore, as will be seen, the transformation into the pseudo-DSM paradigm is free of the typical problems that such systems confront. As noted above, DSM systems are typically implemented through memory management unit (MMU) semantics in operation on every node participating in the sharing. The shared virtual address range is implemented through MMU mappings and through the management of mappings to this address range accesses are coordinated by the runtime system and the shared data is kept consistent across nodes.

However, because of the MMU support, the size of data being shared is limited to the granularity of the page size, as well as the cache policy. There are two drawbacks of these limitations: false sharing and lack of flexibility in assigning coherency semantics.

False sharing refers to the apparent sharing of the same data, along with the accompanying MMU and inter-node messaging for, accesses which are to different variables that fall within the same page.

Since an MMU mapping sets the caching and sharing policy for an entire page, DSM can not be flexible in assigning coherency semantics to data objects that fall within the same page. That is, it is difficult to treat different data with differing sharing semantics—care must be taken to ensure that data mapped at different addresses reflect the correct policy for all data within a page. This restriction tends to force a global sharing (coherency) policy for all data in the shared address range Carter et al. describe systems which do implement variable sharing policies. In order to have multiple sharing policies, however, the shared objects have to have their own page(s) which cannot be shared with objects with a different policy—a restriction which may result in poor memory utilization for the system (J. B Carter, J. J. Bennett, and W. Zwaenepoel, *Implementation and performance of Munin, Proceedings of the* 13$^{th}$ *ACM Symposium on Operating System Principles*, pages 152–164, October 1991).

DDM does not suffer from the above restrictions. Since the shared address range for an exported datum extends for the exact size of the datum, no false sharing can occur. That is, any accesses to the shared datum with handle H and size L fall within the shared address range (H, H+ L). Since the handle H is guaranteed to be globally unique through the mapping service, any accesses which fall within (H, H+ L) have to be to the same data object and thus are not occasions of false sharing.

Therefore, the DDM model is equivalent to a variable page-size system, wherein each exported object is mapped by a page whose size is the exact size of the shared object. Furthermore, because of this, the second problem with DSM systems described above is not encountered: each object has its own (pseudo) MMU page, and so each object can have its own coherency (sharing) policy. This is why, when a DDM object is exported, the sharing policy for the object is specified as described below.

Figure 2A:
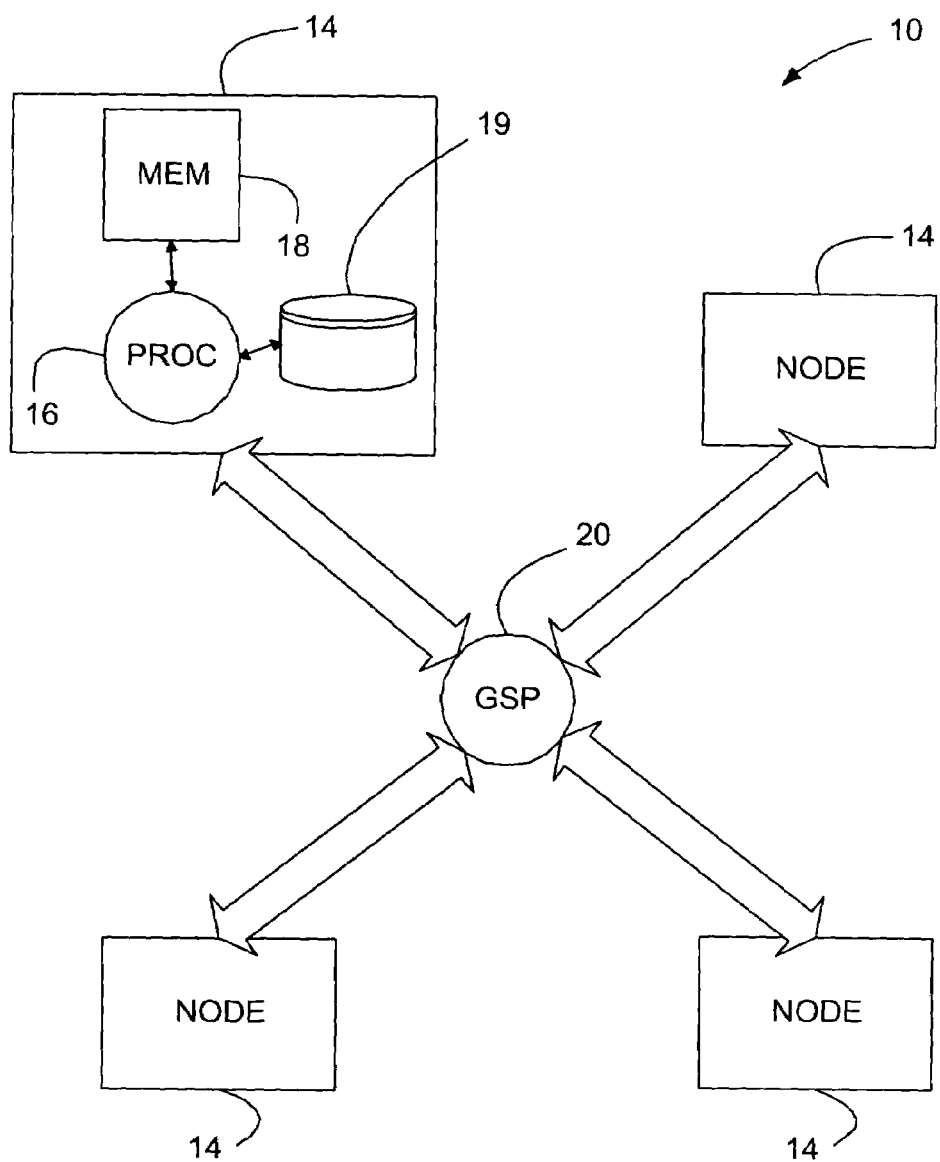
FIGS. 2a, 2b and 2c are block diagrams of group service processes coordinating transfers between processes on different nodes in accordance with the present invention.

A group communications infrastructure which supports DDM is shown in FIG. 2*a*. In the approach shown in FIG.

2a, distributed services are supported by a group service process (GSP) 20. In one embodiment, group service process 20 runs on a separate processor (not shown). In another embodiment, group service process 20 runs on one or more of the processors 16 in system 10. In one such embodiment, group service process 20 runs on every one of the processors 16 in system 10. Library code running in a distributed application interacts with group service process 20 to communicate between processes generated by that application. Group services are primarily carried out by the GSP 20 and the client libraries on behalf of the group members.

Figure 2B:
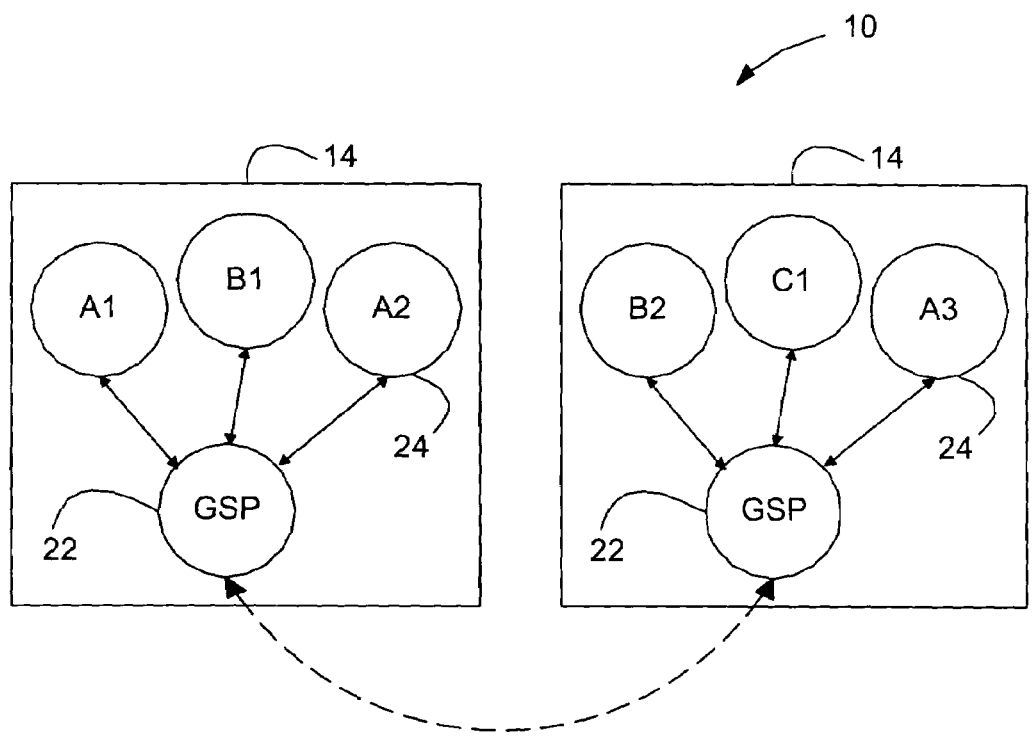

In the approach shown in FIG. 2b, distributed services are supported by a set of two or more group service processes 22. Library code running in a distributed application interacts with the group service processes 22 to communicate between processes generated by that application. In one such embodiment, as is shown in FIG. 2b, there is one such group service process (GSP) running on every node 14 of system 10. Group services are primarily carried out by the GSPs 22 and the client libraries on behalf of the group members. In the example shown in FIG. 2B, three groups of processes 24 (A, B and C) execute on nodes 14. That is, processes A1 and A2 are in the same group of processes as A3 and can access the same data objects.

In one approach the GSPs 22 track the existence of each group. Applications need not know which processes belong to their group. Knowledge of group membership is held in the set of GSPs 22, with each GSP 22 tracking which of its local processes (i.e., processes local to its node) are members of the groups. In one such embodiment, each GSP 22 is only aware of local membership and has no knowledge of membership on remote nodes.

In one embodiment, each GSP 22 tracks group resources owned by members on its own node 14. When members export data to be shared, the local GSP 22 records this. Later, when a multicast arrives trying to locate the owner of the data described by a handle H, any GSP 22 which has a member that exported H will respond to the requesting node.

Distribution services accommodate 1) formation, joining and leaving of distributed process groups; 2) selective multicast communication between members of a group; 3) group communications that perform the same way for processes on the same node and on remote nodes; and 4) synchronized access to and sharing of data structures between a distributed set of processes.

Figure 2C:
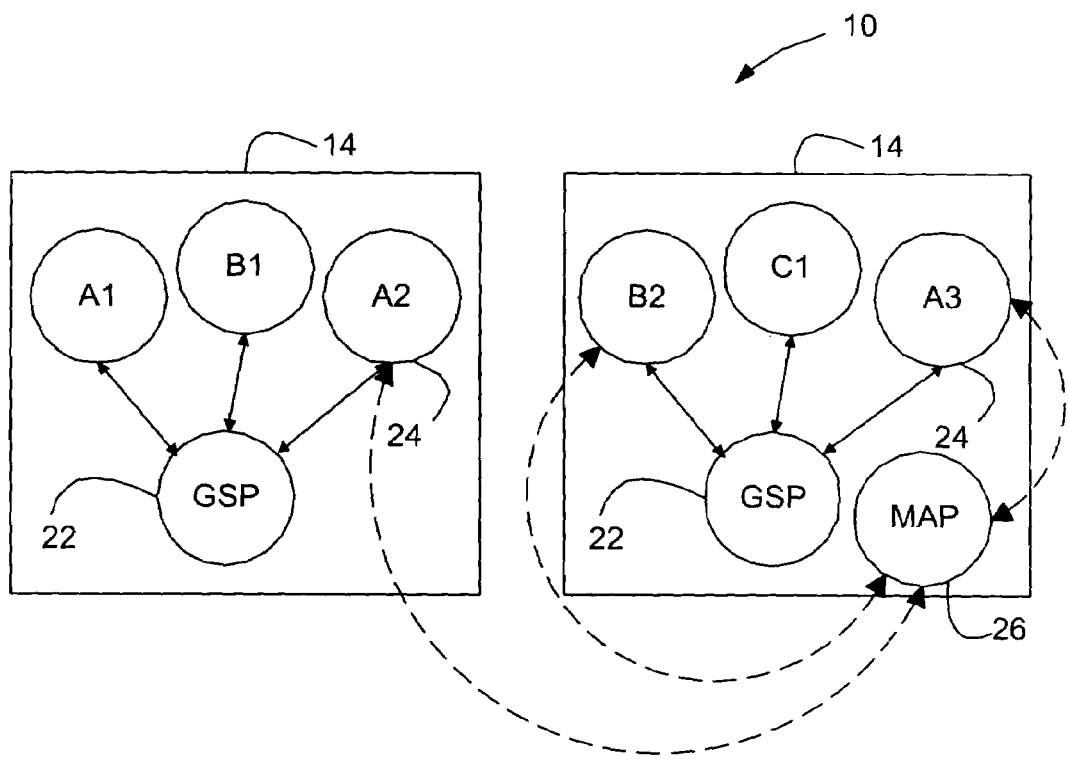

Distributed GSPs 22 can have difficulty ensuring that globally unique names and handles are assigned to each data object. Therefore, in one embodiment, a mapping service 26 is used. Each process 24 consults mapping service 26 to obtain an appropriate data object handle. Such an approach is shown in FIG. 2c.

Figure 3:
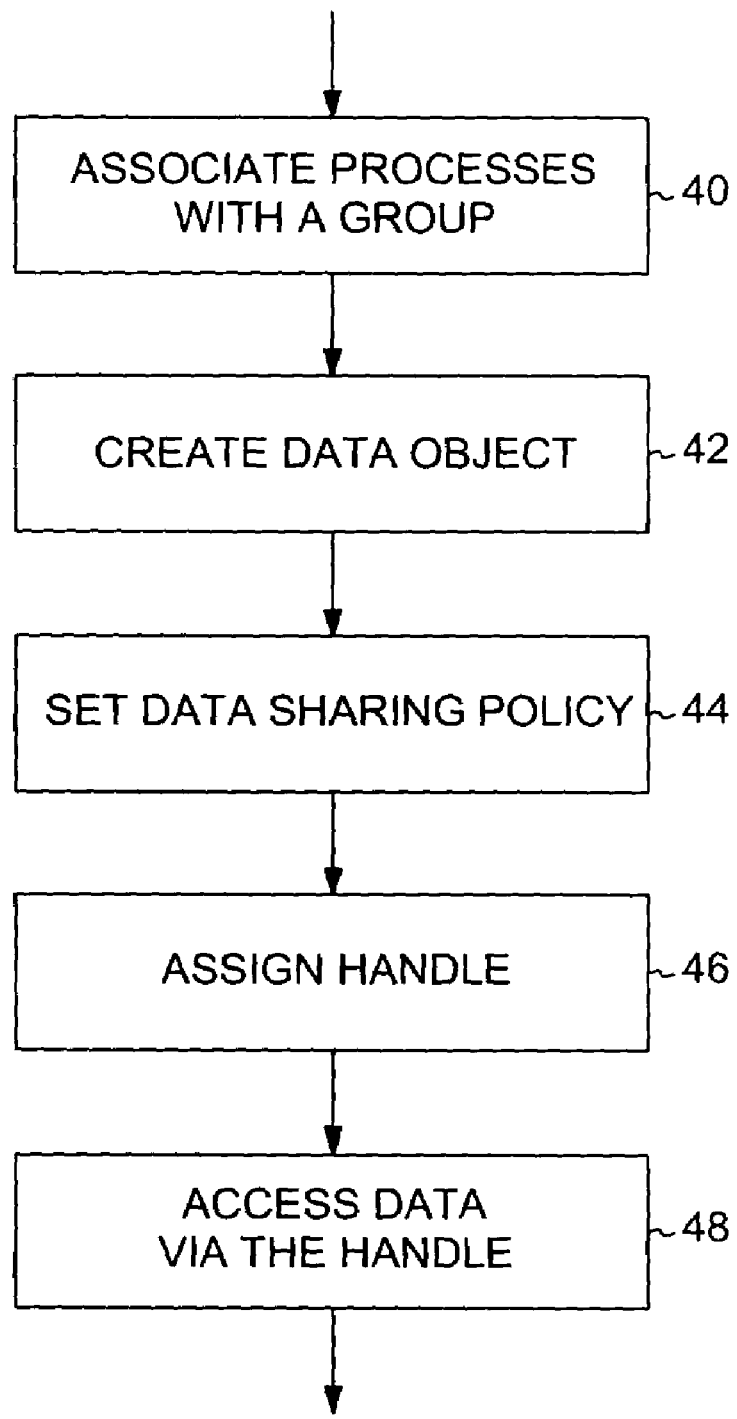
FIGS. 3 and 4 are flow charts showing methods of distributing a handle according to the present invention.

FIG. 3 illustrates a method for ensuring consistency in shared data within a distributed computing system 10 having a plurality of nodes 14. At 40, a group identity is assigned to an application to be distributed as processes across two or more nodes 14.

The processes are distributed and, at 42, one of them creates a data object to be shared with processes in the group. The process does that by allocating memory for the data object in memory on the node 14 on which it is executing. Thus, since the group communication infrastructure assumes the responsibility of forwarding requests for resource owners to the appropriate local group member, the application is relieved of the burden of tracking ownership of group resources, and there is also the avoidance of expensive (from the point of view of the number of messages) forwarding of requests between processes in order to locate the owner of a resource. This latter point is important, since in the DDM system there is at most one multicast request to a group address for any given DDM access (i.e., to locate the resource).

At 44, the process sets a data sharing policy for the data object. At 46, a data object handle is assigned to the data object. In one embodiment, as is shown in FIG. 2b, each GSP 22 coordinates with the other GSPs 22 to obtain a unique handle.

At 48, data is accessed using the data object handle.

Data objects do not have to be distributed before the data represented by the data object can be accessed. That is the point of the mapping service: processes that want to access exported data consult the mapping service by name, and then they get the data object handle.

In one embodiment, once the data handle is known, a read (e.g., a ddm_read) causes the runtime service to locate the data owner through multicast (if the owner is not known) or through unicast (if the owner is known).

In one embodiment, the data object handle is exported to local GSP 22. Each export tells the local GSP 22 that the data object associated with the data object handle H being exported is locally owned by the process doing the export. That allows the local GSP to update its local ownership table, and to respond to messages seeking the owner of the data object associated with the handle being exported.

Figure 4:
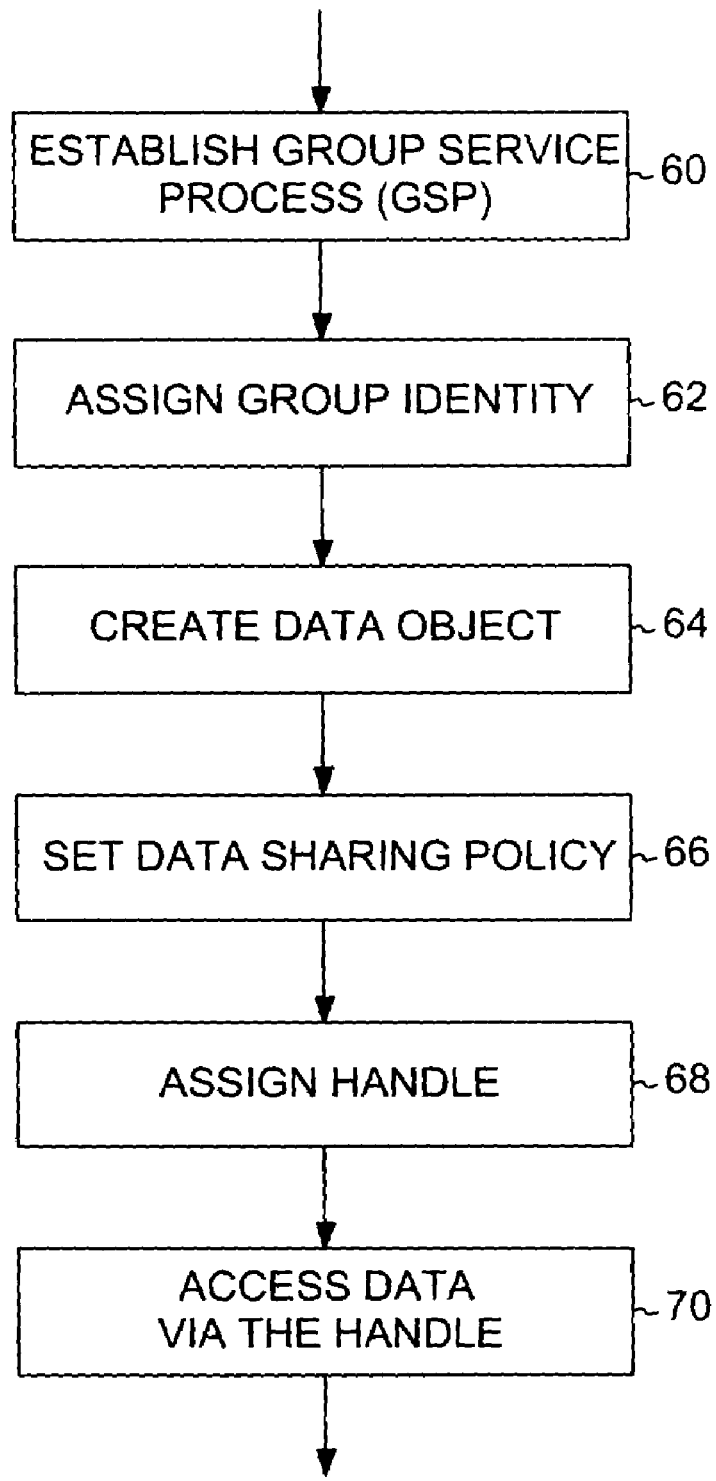

FIG. 4 illustrates another method for ensuring consistency in shared data within a distributed computing system 10 having a plurality of nodes 14. At 60, a group service process is established to track processes joining and leaving groups. At 62, a group identity is assigned to an application to be distributed as processes across two or more nodes 14. The processes are distributed and, at 64, one of them creates a data object to be shared with processes in the group. The process does that by allocating memory for the data object in memory on the node 14 on which it is executing.

At 66, the process sets a data sharing policy for the data object. At 68, a data object handle is assigned to the data object. In one embodiment, as is shown in FIG. 2b, each GSP 22 coordinates with the other GSPs 22 to obtain a unique handle.

At 70, data is accessed using the data object handle. In one embodiment, the data associated with the data object, as well as essential coherency state associated with the data object, can be retrieved by references to the data object handle.

In one embodiment, an application to be distributed across two or more nodes 14 "registers" as a group (i.e., creates a group) in order to employ the distributed services. On every node 14 of the system 10 where there are one or more processes belonging to the application, those processes will join the group. The registration process consists of specifying the types of services required and the semantics of each of those services. But note that the distributed services are only realized with groups—any participating application must become a group before it can access distributed services.

As noted above, when there are two or more GSPs 22, the act of creating or deleting a group has to be a synchronized operation between the GSPs 22. In one embodiment, the group members do not have to keep track of who is in their group, the GSPs will do this. Each GSP will know which processes on its node belong to which groups. A process to do this is described next.

In order to make sure that group communications reach all members of the group, the first time that a process joins a group on a node (i.e., the first time that the particular group has a member from that node), all the GSPs having members in the group will be informed. The GSPs maintain a vector of all the nodes that belong to any group that the GSP has members in, and the addition/deletion of a node to/from a group is therefore necessary for the GSPs to keep their group node vectors up to date.

Therefore, if a process leaves a group and that group no longer has any members on that node, the GSP must inform the other GSPs of this event as well. Therefore, in one embodiment, the set of GSPs 22 having members in a given group not only track local group membership, but also which set of nodes 14 have members belonging to the group.

The data object coherence system is described further below. But first, sharing of data between group members on different nodes will be discussed.

Distributed Data Management Services

In this section we consider the sharing of data between group members residing on different nodes 14. The data is shared among the members, but is not equally accessible to all members. Recall that the underlying assumption for architectures using these Distributed Services is that no process has direct access to memory on a remote node 14—the data-sharing model does not accommodate a tightly-coupled shared memory. In addition, in one embodiment, no global MMU mapping of data objects is done. If a data object is shared between the members of a group, then a copy of the object will be found on all nodes on which the data is accessed. Furthermore, the runtime system on the node of the data owner (writer) will know which nodes in the group have copies of the data.

The role of the Distributed Data Management (DDM) services is to manage the access to each node's private copy of the object and to coordinate accesses to the data object among group members such that the contents of the object change in a coherent manner.

With the DDM services, the group data on each node 14 is allocated and mapped by the application when it is accessed. The DDM library and the local GSP 22 manage and coordinate the coherency of the data set, as well as requesting or issuing updates to other nodes as necessary, all of which being done transparently to the application. Note that in the DDM model, the DDM library does not have direct access to the application's data, and therefore there are no data addresses involved in the coherency management and update generation. Rather, opaque handles are used to refer to the coherency state of group data, and only in the case of an application providing data it owns for the rest of the group to share is a private address of the data supplied to the DDM library running in its address space.

As noted above, DDM maps the sharing of objects across a distributed system by transforming the sharing into a pseudo-DSM setting, but without the false-sharing problems of DSM systems. Once, however, the management of the sharing of the data can be treated like a DSM implementation, the optimizations available to DSM systems can be applied to DDM (i.e., weaker consistency models, write buffering, etc.). All of these DSM optimizations reduce the number of messages between nodes for both data updates and coherency management. As a result, the sharing of the objects in the system can be done more efficiently (i.e., with less messaging overhead) than if it were treated as an object-based system in which each object that is shared is done so through explicit reference to its name.

In one embodiment, this is accomplished through APIs which the applications must use to access data shared across nodes. The APIs reference the data through references to the associated handles. There is a runtime system which engages in implicit messaging on behalf of the application when it attempts to access the shared data.

In one embodiment, the runtime system (i.e., DDM services) stores coherency state in two different ways. The coherency state is accessed by handle. On nodes in which the data is a replica or a copy of data owned on another node, the coherency state can indicate that the replica is valid or invalid. In addition, the runtime system tracks the node where the owner resides. The runtime system on the node of the data owner or writer stores the sharing policy, the current coherency state, and the set of nodes that have a valid copy of the data associated with each handle. Whenever invalidates or updates are generated by the data owner, they are pushed by the runtime system to the set of nodes with copies of the data. In one embodiment, this is done by selective multicast.

Finally, the DDM services implement ownership-based policies for data sharing, in the sense that data can only be written by the data owner and that the changes in the coherency state of shared data are determined by the data owner.

Exporting a Data Object for Sharing

When data is exported by a group member, a data object is made visible so that it can be shared by all group members. The sharing semantics, or data policy, specify ownership, sharing and the semantics of updating the data object when modified. The data policies encompass the following:

migratory data vs. permanently owned (migratory data can be written on any node, permanently owned data is data that can only be written by one process, the process exporting the data). Whatever the policy, the process doing the export starts out as the owner.

uncached vs. replicatory (the data can only be read in a message passed from the owner's DDM library up to the remote reader's application space, as opposed to allowing the remote reader's DDM services to cache or replicate the data). The uncached data policy does not allow remote caching of data. It may make sense for rapidly changing data. Replicated data is cached remotely; it is desirable if it is going to be accessed frequently and it is not changing too quickly relative to the access rate.

remote write. If the data is not migratory, it can only be written by the permanent owner. Remote write permission means that the owner will act as a write-server in that it will carry out requests to write the group data on behalf of a remote client.

lazy or eager invalidate-on-write vs. lazy or eager update. These policies refer to actions taken when the owner of the data modifies the data. Invalidate-on-write involves the invalidation of all remote (cached) copies of the group data prior to the owner's copy being modified. Eager invalidate-on-writes are writes which invalidate remote copies before data is written. Lazy invalidate-on-writes are writes which allow the data write first and then the invalidate is issued to the remote copies.

This contrasts with update policies, which keep remote copies of the data consistent with the owner's copy. Eager updates are updates which are applied to the remote copies "at the same time" as the changes to the owner's data are applied. That is, remote writes are performed first, and then the local write is completed. Until the local write is completed, all read and write requests to the data being written are buffered.

Lazy updates are updates which are pushed out to the remote copies as soon as the owner's data has changed (the owner's writes to the local copy are not held up waiting for remote updates to be applied).

When the DDM services export data for sharing, they must provide the size of the data object. This information is provided by the application exporting the data. Since data management is outside of DDM services and the data is completely opaque, the DDM services have to rely upon the application to specify the appropriate size of the data for sharing. In one embodiment, updates to a data item associated with one handle are the size of the item when it was exported. That is, an update requires a write of the entire data item.

In one embodiment, no exported data object can be larger than 512 bytes. In such an embodiment, each application must take care to assign handles for its shared data appropriately. For example, if an array is being exported, it may make sense to assign a handle to every element in the array. Or, if a data item is changing frequently, it would make sense to have the size of the data be on the same order of the size of the updates to the data. For example, if an object is exported as 1K in size but has less than 32 bytes written whenever it is modified, then 1K may be a poor choice for the data size, since all updates will be the full 1K bytes.

In one embodiment, changes to the data within the data object are saved as incremental changes, e.g., by storing the data with the handle and an offset into the data object or by storing the offset and data in a handle-related file. When a data object is modified, the update includes the list of the incremental changes.

In one embodiment, coherency is managed across sections of each data object. In one such embodiment, the DDM services tune the smallest piece of data for which coherency is being managed as a function of the type of applications being executed. Other factors may be considered as well, such as process locality or memory availability.

Considering all of the above, in one embodiment, the API to export data for a group is given as:

ret=ddm_export(grp_id, handle, address, policy,
        size);

where address is the local address of the data being exported. In one embodiment, it is possible to specify more than one data object in the export call when data is exported for sharing. In one such embodiment:

ret=ddm_export(grp_id, data_vector, count);

where each item in the data_vector is a structure that specifies handle, policy, local virtual address and size for the item being exported.

For purposes of tracking ownership of group data, in one embodiment a GSP 22 on every node 14 of the group sharing a data object stores the handle, size, owner and policy information for each data object owned by a process local to that node 14. In one such embodiment, when a process exports a data object for a group, the API communicates through local IPC with the GSP on that node. The GSP then updates its ownership table for the group to include the handle, size, owner and policy information for the exported data object.

In one embodiment, a remote node that wants to access a data object on behalf of a group member process on its node sends a request to the GSPs in the group. Each GSP that receives the request consults its ownership table; the GSP that finds the data object in its ownership table responds to the multicast query.

Reading and Writing Group Data

When a group member accesses a group data object, it does so through DDM APIs. System 10 is not a true DSM system. It cannot, therefore, access shared variables through accesses to addresses that fall within the shared virtual memory space. Instead, all accesses to shared DDM data go through APIs which reference the data by handle. The APIs call into the runtime system (e.g., DDM services). The runtime system then examines the sharing policy and state of the data being accessed and generates the appropriate messages via group communication.

In one embodiment, the DDM APIs enforce coherency policy. That is, they call into the runtime system and allow it to examine the coherency state of the data associated with the handle referred to in the API.

The APIs also allow access to data which is locally owned.

When a process accessing the data is the owner of the data, the role of the DDM services is to look for any changes to the coherency state of the data and to propagate coherency changes, if any, to other nodes 14. In addition, the DDM services decide whether any data changes need to get pushed out. When the data access is not done by the data owner, then the DDM services will have to guarantee that consistent data is available on the local node 14.

Read access to group data will be discussed next. There are two types of reads. The first is a read by a process that owns the data object. When a process owns a data object it will never be invalidated by another process, nor will a local read change the coherency state of the data (i.e., no coherency messages will get propagated to other nodes). Therefore, the owner of the data can safely read its own data any time.

The second type of read is a read by a process that does not own the data object, but that is instead requesting a remote read.

An API that accommodates both types of read requests is:

ret=ddm_read(group_id, ddm_handle, &result,
        &length)

When executed, a read request is multicast to the GSPs in the group. After the reply arrives the data is copied into the buffer pointed to by result and the length copied will be given also.

When the caller is the actual owner of the data no coherency action is involved in the read. Only remote reads of the data can potentially change the coherency state. Therefore, when the data owner goes through the DDM APIs to read its own data, the data will be copied unnecessarily. This situation can be optimized if the system is designed such that the owner knows when it is reading data it owns. The owner process can then read the data without going through the DDM APIs.

The situations in which writes to group data are allowed are when the process owns the data, the owner of the data has set the data policy to allow remote write requests, or the owner is willing to transfer ownership (i.e., migratory data). The API to write data is:

ret=ddm_write(group_id, ddm_handle, &new_value,
        length)

If the writer is already the current owner of block, then the data policy and coherency state of the data must be inspected before the local write. If the policy is to invalidate before a write, then a invalidate message is multicast either to the set of nodes that have copies of the data (selective multicast), or to all the nodes in the group, depending upon the platform multicast characteristics. The data is then written and the coherency state set to exclusive. In one embodiment, the DDM code tracks the degree of data sharing in terms of nodes and, if the data is not shared (not in any other nodes), no invalidates are issued.

If the policy is to update before or after the write (the two flavors of update are discussed above in the section on exporting data), the updates will be multicast to the set of nodes sharing the data before or after the local write.

If the process is not the data owner and the policy allows remote writes, then the DDM library will multicast a remote write request. The data owner is the only process that responds to the remote write request. With this policy, the owner functions as a write server.

The most complex scenario is that of migratory data. Since a process must be the owner of the data before it writes it, there will be the initial work for the DDM services to transfer ownership of the data to the would-be writer. The protocol for transferring ownership involves either multicasting the transfer-of-ownership request to the group address (non-selective multicast) if the data owner is not known, or unicasting the request to the owner if the owner is known. The data owner receives the transfer-of-ownership request, completes any pending writes and then transfers ownership of the data to the new owner. The process then continues as described above for writing when the process is the owner of the data.

Figure 5:
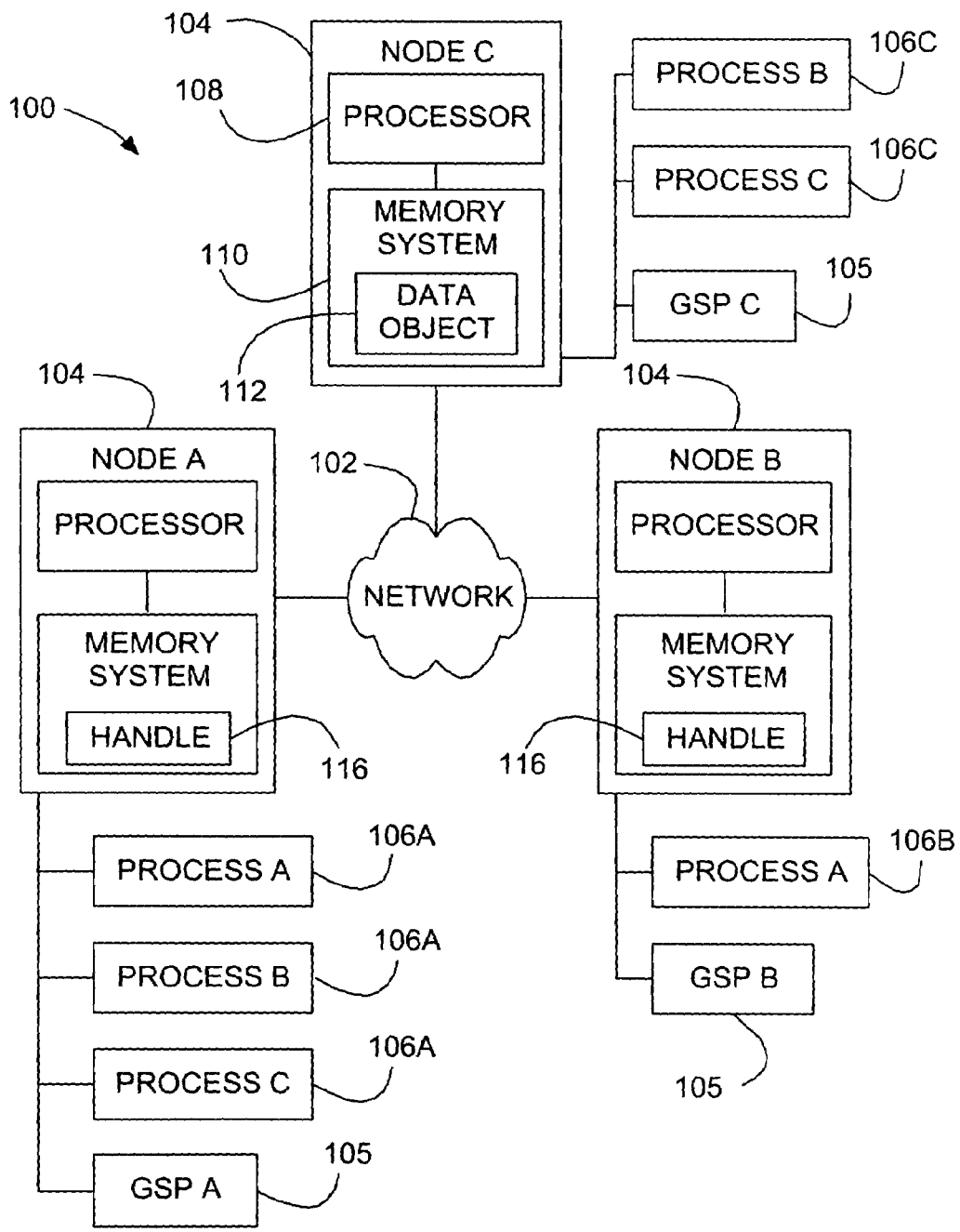
FIG. 5 is a diagram showing interaction of data objects, handles, processes and group services in accordance with one embodiment of the present invention.

These DDM services can be applied effectively to, for instance, a router 100 having two or more route processor nodes 104 connected over a network 102 as shown in FIG. 5. As noted above, network 102 could be a switch fabric or other data communications network.

Each of the nodes 104 acts as an interface between the network 102 and one or more processes 106 executing within each node 104. Each node 104 may include several types of equipment to service the associated processes 106 and to connect the processes 106 to the network 102. For example, as described above, each node 104 could include at least one memory system 110 and one or more processors 108.

In accordance with the present invention, a data object 112 is accessible through a selected one or selected ones of the plurality of nodes 104 by a process 106 executing within an associated one of the plurality of nodes 104. In one embodiment, a group service process 105 on each of the nodes 104 ensures reliable communication between related processes on each node 104.

In accordance with the present invention, and as described above, a handle 116 is associated with each data object 112. Handle 116 is used as to identify data object 112. In one embodiment, data object 112A or a copy of the data object 112A is stored in memory system 110. Each data object 112A can be accessed by processes 106A associated with node 104A. In addition, processes 106B associated with node 104B or processes 106C associated with node 104C can access data object 112A, but only through the handle. At the same time, data object 112C is stored in the memory system 110 of a node 104C and can also be accessed by processes 106 associated with other nodes 104 via the handle.

Process 106 looks up the data by its unique name and obtains the handle associated with that name. Process 106 then requests access to the data via the handle.

Process 106 may, for instance, require access to data object 112 to perform a particular function or functions. In one embodiment, handle 116 is stored at each of the nodes 104 associated with processes 106 that are authorized to access the data object 112. In another embodiment, handle 116 is stored at each node 104 associated with processes 106 that have accessed the data object 112 in the past. In one embodiment, handle 116 is stored at each node that may access data object 112 in the future.

In one embodiment, the runtime system stores coherency state (valid or not) for each data item accessed as a copy on a given node 104. The runtime state is acquired by accessing handle 116. The runtime system stores the sharing policy, the current coherency state, and the set of nodes which have a valid copy of the data associated with the handle on the node 104 of the data owner for each data item. This information is accessed by handle. In one embodiment, invalidates and updates are broadcast to all nodes 104. In another embodiment, invalidates and updates are pushed to the set of nodes with copies of the data via selective multicast.

In one embodiment, only the owner of the data object can modify that data object. The owner or creator of the data object 112 may be any one of the processes 106.

Local copies of the data object 112 may also be invalidated in response to the data object 112 being updated. In one embodiment, the owner of data object 112 broadcasts a signal to invalidate all cached copies in response to the data object 112 being modified. In one such embodiment, process 106 includes an algorithm to validate the data object 112 to confirm that the current version is being accessed.

In one embodiment, DDM services executing on one of the processors 108, or another device in system 100, record the nodes that access and replicate data object 112.

The greatest cost in using DDM APIs is in the overhead of the communication of the coherency state changes for the data, since the coherency state changes involve remote operations that must be acknowledged, etc. In one embodiment, therefore, an API is provided that starts changing the coherency state of data about to be accessed and temporarily locks that state:

ddm_prefetch_write(group-id, ddm_handle)

In one such embodiment, the API kicks off the coherency state changes that would happen if ddm_write were called and temporarily locks them (e.g., by holding off remote read requests which would force the data back into the shared state). Then, when the write happens either the coherency state changes are in progress or they are complete and so the write can go through as a local write. This API is available for applications that perhaps are doing several writes to different data sets and wish to inter-leave accesses with a prefetch in order to reduce the delay incurred by coherency maintenance.

Group Membership

Since a group is a collection of processes 106 which function together to represent a distributed application or service, it is fitting that groups have a unique identity. In one embodiment, groups have names (e.g., ASCII strings) which must be unique across the system.

In one embodiment, all applications that want to function as a group make either a group_create or a group_join call. That is to say. At least one of the processes has to make the group_create call and the rest can make the group_join call. Note that group_create acts like a group_join if the group already exists, so that it is equally suitable for all potential members to make a group_create call.

In one embodiment, the group_create call has the following format:

group_id=group_create(name, attributes, message-_handler)

where:
  name: ASCII string for group name
  attributes: specifies semantics for the group, such as open or closed (semantics for non-group-member to communicate with group—default is closed), or public or private (group members are informed when other group members join/leave a public group, but not so for private groups).
  message_handler: a callback function provided by the application, which is invoked by library code running in the application when a message arrives for the group member.

In one embodiment, a group can be joined explicitly through the group_join call:

retcode=group_join(group-id, message_handler)

The parameter message_handler is the same as that for the group_create call. Group-id is retrieved from either a group_lookup call, in which the name of the group is passed in and its group-id is returned to the caller if the group exists in the system:

group-id=group_lookup(group-name)

When a process joins a group, it is given a unique member-id that is used in all subsequent communications involving that member. A member can obtain its member-id in a group via the group_get_memberid call:

retcode=group_get_memberid(group-id, &member_id)

As will be seen in the section on group messaging, a process's member-id within a group allows it to be targeted in a message from another member through the group_send_memberset call.

Coherency State Notifications

In one embodiment, an API is provided that can be used to specify that the calling process wishes to be notified when the data associated with a handle is modified. Since the modification of shared data generates coherency messages, this API ensures that all coherency messages associated with a data set come to the node of the requester. If a process wishes to get notification when some subset of group data changes, the DDM services on the node of that process will subscribe to the coherency messages for that data.

In order for this mechanism to work, the owner of the data (or all the nodes in the case of migratory data) must know to include the node requesting notification in all coherency multicasts for the data in question and the GSP on the node of the requester must know of the request. Each GSP will track all coherency notification requests for processes on its node on a per-group basis so that it can deliver local notification when it sees the relevant coherency messages.

It is interesting to note that this process of subscribing to coherency messages does not generate any extra multicasts over the communication medium—more nodes are potentially added to existing multicasts. And on platforms where all multicasts must go to all the nodes in a group (multicasts go to a group address) no new nodes are added at all. Furthermore, with this mechanism, an explicit notification is delivered locally only.

The API for notification serves two purposes: it allows an application to access local copies of group data and it avoids unnecessarily incurring the overhead of DDM APIs. DDM APIs are still used, however, when a notification arrives in order to refresh the local copies again. Or, some applications may want to know when data changes and don't necessarily want to access the data. This latter case is particularly interesting in that it attracts coherency messages to the node simply for purposes of receiving notification and not for data accesses—it looks like an uncached access to the group data.
  The API is:

ret=ddm_get_notification(group_id, ddm_handle_vector, count, type)

Note that in this embodiment there is a parameter count in the API. Count is the number of handles in the vector. Type refers to one or any combination of the following types of asynchronous notifications:
  local data invalidation (data was changed by owner—pull model)
  local data was updated (data was changed by owner—push model)
  a request for a remote write came in to the data owner
  the local node lost ownership of the data (migratory data only)

Group Messaging APIs

In one embodiment, group messages that are to be delivered to all the nodes 14 having members in a group will be implemented through the APIs group_send, group_send_nb and the group_send_sync APIs. The API group_send will be discussed first:

retcode=group_send(group_id, msg, len, reliability)

where group_id is the id of the group to send the message to. Note that if the group is closed, then the sender must be a member of the group;
  msg is the address of the actual message to deliver to the members;
  len is the length in bytes of msg; and
  reliability is the reliability semantics as determined by the sender. This field translates to how many acknowledgements the transport layer must receive before the caller is unblocked. The choices for reliability are: ACK_NONE (the message is unreliable since no acks are required), ACK_ONE (just ensure that one node of the targeted nodes received the message), ACK_MOST (a majority of nodes must have received the message) or ACK_ALL (all nodes are required to receive the message).

Note that the transport layer will retransmit the message until the required number of acks are received, or until a maximum retransmission count is reached, in which case it will fail the message delivery. Note also that the acknowledgements are delivered by the transport layer on the receiving node, not by the group members.

When the sender wants to block for as little time as possible, it can also use the group_send_nb API, which unblocks the sender as soon as the message is transmitted. At some later time the sender will receive the status for the message that was delivered, although it is optional to specify that the sender only be informed of error status.

retcode=group_send_nb(group_id, msg, len, flags, reliability, tag)

where
  group_id is the id of the group being sent to;
  msg, len: pointer to the message buffer and its length in bytes;
  flags: allows the sender to indicate that send status is not to be given for successful delivery, just errors. The default is to deliver send status for every message.
  reliability: same as discussed for group_send; and
  tag: application-specific label for the message that allows the application to associate a send status with a message
  Since group_send keeps the sender blocked until the message is delivered to the targeted nodes, but not to the remote group members, the API is fundamentally asynchronous, since the sender is uncoupled from the receivers. The API group_send_nb has an even higher degree of asynchronicity.

If the sender wants synchronous semantics and be kept blocked until the message is delivered to each remote member, it can use the group_send_sync API, which will aggregate all the responses from the members and deliver them to the sender at one time. In this API, each response is structured to indicate the responder's member-id in the group, the status of the response, the actual length and the response itself. The sender must allocate storage for the responses to be received.

retcode=group_send_sync(group_id, msg, len, timeout, rcnt, rlen, rbuf)

group_id, msg, len: same as discussed above timeout: since the sender is waiting for the aggregation of responses from all the members to whom it sent the message, it can be blocked for a long time. The parameter timeout specifies a maximum time the sender is willing to wait for any given member to respond. In an asynchronous distributed system there can be indeterminate scheduling delays on remote nodes, and the timeout parameter bounds the delay. I.e., if the timer expires on a given node, that member's response status will be marked as having timed out.

rcnt: the number of responses the sender allocated memory for rlen: the maximum length allocated for any response rbuf the address of the response buffer allocated by the sender The APIs discussed are for sending to all the members of a group. It is also possible to send messages to a specified subset of members using selective multicast. In order to understand these APIs, selective multicast must be explained.

In selective multicast, a subset of nodes is targeted to receive a message. In one embodiment, a multicast message is always sent to a group address and all nodes in the address receive the message. Through a compact representation called a sparse node vector, however, a subset of those nodes can be specified to receive the message. The messages are constructed such that the message is marked as containing a sparse node vector. The transport layer receiving the message reads the sparse node vector in the message header and checks to see if its node is in the vector. If not, the message is dropped. If so, it receives and processes the message. Thus, sparse node vectors allow for easy filtering of messages at the receiving transport layers.

Therefore, selective multicast is possible through the use of a group address for a multicast, working in conjunction with the sparse node vector, a light-weight mechanism to specify an arbitrary set of receiver nodes within the group, and which is a generalization of a flat bitmask to accommodate a large number of nodes in any configuration.

Given the mechanism of selective multicast, it is possible to construct two sets of APIs through which one can direct a message to a subset of members within a group, group_send_memberset and group_send_nodeset:

retcode=group_send_memberset(group_id, member-vector, entries, msg, len, reliability)

member-vector: array of member-ids to which the message is to be delivered entries: the number of members in member-vector All other parameters are as discussed above.

The group messaging layer will construct a sparse node vector to represent all the nodes targeted in member-vector (the member-id has a node component to it), and the message will be selectively multicast to this set of nodes. Once the message reaches the nodes, the group messaging layer then delivers it to the members that are in the member-vector that are on its local node.

The API group_send_nodeset allows a member to supply a sparse node vector in a message such that the message is delivered to all members (as opposed to specified members as in group_send_memberset) on the specified nodes.

retcode=group_send_nodeset(group_id, node-vector, msg, len, reliability)

where all the parameters are as discussed above, and node-vector is a specification of the target nodes as a sparse node vector.

Note that the APIs group_send_memberset and group_send_nodeset can have synchronous (group_send_memberset_sync, group_send_nodeset_sync) as well as non-blocking variants.

Synchronization Services

In a normal (non-distributed) multi-threaded application, it is often necessary to synchronize access to a shared resource or critical section. Access to shared resources can be serialized and mutual exclusion guaranteed though the use of mutexes, semaphores, or other locking mechanisms.

In one embodiment, a set of synchronization services is offered as part of the Group Services in order to support synchronization among members of a distributed application. One approach is to use a set of synchronization managers that serialize requests to access synchronization variables in their own private memory. That is, the group members do not have access to the group's synchronization variables—only the synchronization managers do. Each of the synchronization managers own different sync variables, which they serialize access to, queuing waiting callers and awakening them in order. In one embodiment, the required blocking of the callers for the synchronization to be accomplished is done by leaving the callers reply-blocked in their IPC to the appropriate synchronization manager. In one embodiment, each synchronization manager is a GSP 22.

Support is offered for the following synchronization variables: mutexes, semaphores (counting semaphores) and barriers.

In one embodiment, APIs allow one to define/create synchronization variables.

In one such embodiment, a tag is passed in with the call so that the caller can distinguish sync variables of the same type—the tag becomes associated with the sync variable. The call returns a sync-id, which is a 32-bit handle that incorporates the group-id:

sync-id=group_sync_create(group-id, tag, sync-type), where sync-type includes GROUP_SYNC_MUTEX, GROUP_SYNC_SEMAPHORE, and GROUP_SYNC_BARRIER. For each type of synchronization variable the appropriate APIs are provided.

For mutexes:

sync-id=group_sync_create(group-id, tag, GROUP_SYNC_MUTEX), and then the subsequent APIs:

ret=group_sync_mutex_lock(sync-id), ret=group_sync_mutex_unlock(sync-id), ret=group_sync_mutex_trylock(sync-id) (if locked, don't block caller)

For semaphores:

sync-id=group_sync_create(group-id, tag, GROUP_SYNC_SEMAPHORE), and then the following APIs:

ret=group_sync_sem_init(sync-id, value), (set initial value of counting semaphore)

ret=group_sync_sem_wait(sync-id), (acquire semaphore, blocking)

ret=group_sync_sem_post(sync-id), (release semaphore)

ret=group_sync_sem_getvalue(sync-id), (get the current value-may return negative)

ret=group_sync_sem_trywait(sync-id), (try to get semaphore, non-blocking)

For barriers:

sync-id=group_sync_create(group-id, tag, GROUP_SYNC_BARRIER), and then the following APIs:

ret=group_sync_barrier_init(sync-id, value), (set threshold of barrier)

ret=group_sync_barrier_wait(sync-id) (wait at barrier until threshold arrive)

All synchronization variables are destroyed via the following:

ret=group_sync_destroy(sync-id)

One final API is required. Since the synchronization variables have a tag associated with them, it is necessary for a member to find which sync variable is associated with a specified tag:

sync-id=group_sync_lookup(group-id, tag, &type)

Note that group_sync_lookup will return the sync-id and the type of the synchronization variable.

If there are critical sections in a distributed application such that it is necessary that only one member of the group enter that section at a time, then the application can associate either a mutex sync variable with the critical section, or a semaphore. If it is possible to have N members executing in the critical section (N>1), then a semaphore would make sense.

In one embodiment, the application associates a tag with the critical section if there are more than one critical sections in the application. For both the blocking group_sync_mutex_lock and group_sync_sem_wait calls, the callers would remain blocked until the synchronization manager granted them access. If it is necessary for the callers to try to get access but not block, then the group_sync_mutex_trylock and group_sync_sem_trywait calls can be used.

If one views access to a group resource as a critical section, then the same considerations apply as in the discussion of critical sections. An application can choose to use the group synchronization methods (mutex or semaphore) to ensure orderly access to shared group resources. Note that the discussion above in section 4 about the write manager is actually a special case of this. Write access to group data can be organized through group mutexes or semaphores.

Please note that all of the sync variable APIs could keep the caller blocked indefinitely if a deadlock has occurred. In order to prevent deadlock, all blocking calls, with the exception of the group_sync_barrier_wait call, will have timeouts associated with them.

Note, finally, that a group with more than one synchronization variables may have more than one sync manager. The call group_sync_create is handled by the local GSP and, therefore, the ownership of a group's sync variables may be distributed over a set of nodes. Just as in the case of DDM data, each GSP responds to queries/requests about the synchronization variables it owns, and the other GSPs will remember the ownership node of a sync variable as it is accessed by a group member on its node.

Write Managers

There is a simple way to organize writes to a data set when there may be multiple writers of the data. If there are potentially a large number of writers then the technique may have scaling problems, but as it is interesting because it is simple to implement. If the group had a manager to synchronize writes then full cooperation among the writers could be achieved, at the cost of blocking waiting writers while one writer in the group proceeds at a time.

Under such an approach, whenever a group member wants to write shared data, instead of contacting the owner to request ownership, it would issue a request to acquire ownership to the "write manager". If the shared data to be written is currently being modified by another member, then the write manager will keep the next writer blocked until the current writer is done. All members waiting to write blocks being written can be kept in a wait queue in a blocked-on-reply state. Whenever write ownership is transferred, the writes are either propagated to the set of nodes having the data cached (update), or the invalidate policy is enforced prior to the write.

There would have to be an API between a potential writer—one which requests permission to write and one by which the current writer would use to releases the blocks it had written. The next process in the wait queue can then be unblocked so that it can then write the data.

This suggestion for using a write manager is a special case of the synchronization managers discussed above. The need to manage writes is not always a good decision and is really up to each application. For example, it may not be a good idea for a group with a large number of members, especially if the frequency of writes is high and the amount of data being written is very small. On the other hand, if there are few writers that write a large amount of data each time, the overhead of serializing the writes may result in an overall gain in efficiency.

Weaker Consistency Models

An example of how this DDM system can be used to implement weaker consistency models will be given. A weaker consistency model implies that modifications to shared data can be buffered and have their update propagation delayed to a later time—i.e., remote copies of the data can become stale (not invalidated or updated) without affecting the applications sharing the data adversely. The example given will be that of entry consistency, which allows one to associate shared data with a synchronization variable, discussed above, and maintains that propagation of coherency messages can be delayed until synchronization points governed by the acquiring of a synchronization variable are reached.

If a synchronization variable were created for a group as described and it had sync-id "sid", then a new API can be employed to associate the consistency of a set of data with the synchronization variable sid. The association is expressed through handles and in the API ddm_associate, the handle_vector is an array of data object handles of dimension count:

ddm_associate(sid, handle_vector, count)

Once this association is established, the following sequence of operations can be performed (assume for the discussion that the synchronization variable sid is a group mutex; assume also that handle_vector consists of four handles h1, h2, h3, h4)

1. group_sync_mutex_lock(sid)
2. ddm_write(h1, new_data1, length1)
3. ddm_write(h2, new_data2, length2)
4. ddm_write(h3, new_data3, length3)
5. ddm_write(h4, new_data4, length4)
6. group_sync_mutex_unlock(sid)

These series of operation would not necessarily result in any coherency messages being sent to the rest of the system. Instead, if the runtime services see that the local node owns the data h1, h2, h3, h4, it would do nothing. If any of the data object handles are owned remotely, the runtime system would make the current node the owner and retrieve any modifications to the data. Therefore, by the time the group_sync_mutex_lock completes in step 1, the local owner has up-to-date values of the data associated with the synchronization variable and is the owner of all the variables.

At steps 2 through 5, the runtime system would buffer the writes to the affected data by handle. At a subsequent lock of the synchronization variable sid, the runtime system can either retrieve all buffered writes to the associated handles, or leave the writes buffered if the current node is the owner of the handles.

This example demonstrates that by delaying coherency messaging until definite synchronization points, the implicit coherency messaging can be reduced and the updates that are propagated to other nodes reduced as well.

In the above discussion, the term "computer" is defined to include any digital or analog data processing unit. Examples include any personal computer, workstation, set top box, mainframe, server, supercomputer, laptop or personal digital assistant capable of embodying the inventions described herein.

As noted above, the present invention is a system and method for ensuring consistency in shared data within distributed computing systems. The distributed computing system has a plurality of nodes, wherein each node includes a processor and memory. An application is distributed across two or more nodes, including a first node, wherein distributing the application includes creating processes, associating the processes with a group and distributing the processes to the two or more nodes. A data object is established in memory on the first node, wherein establishing a data object includes allocating memory for the data object. The data object is exported to processes associated with the group. Exporting the data object includes setting a data sharing policy for the data object and assigning a data object handle to the data object, wherein the data object handle includes information regarding the data sharing policy and a memory size label representative of memory allocated for the data object. The data associated with the data object, as well as essential coherency state associated with the data object, can be retrieved by references to the data object handle.

In one embodiment the methods described above are implemented as program code stored on articles comprising computer readable media. Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method for sharing data within a distributed computing system having a plurality of nodes, wherein each node includes a processor and memory, the method comprising:
    distributing an application across two or more nodes, including a first and a second node, wherein distributing the application includes creating application processes, associating the application processes with a group and distributing the application processes to the first and second nodes;
    defining a data object in memory on the first node, wherein defining a data object includes allocating memory for the data object;
    assigning a name to the data object;
    making the data object available to the application processes on the first and second nodes that are associated with the group, wherein making the data object available includes mapping the name to a data object handle;
    returning the data object handle to a process associated with the group in response to a request from the process based on the data object name; and
    accessing data within the data object from the second node through references to the data object handle.

2. The method according to claim 1, wherein defining a data object further includes setting a data sharing policy for the data object.

3. The method according to claim 1, wherein accessing data includes querying a mapping service process with the data object name in order to retrieve the data object handle associated with the data object name.

4. The method according to claim 1, wherein accessing data includes determining ownership of the data object and requesting transfer of the ownership of the data object to a process on the second node.

5. The method according to claim 1, wherein associating the application processes with an application group includes establishing a group service process on one or more nodes, wherein each group service process tracks membership of processes in groups.

6. The method according to claim 5, wherein each group service process tracks formation of an application group, joining of processes to the application group and exit of application processes from the application group.

7. An article comprising a computer readable medium having instructions thereon, wherein the instructions, when executed in a computer, create a system for executing the method of claim 6.

8. The method according to claim 5, wherein the group service process differentiates between accesses to a data object stored within memory of the node on which the group service process executes and accesses to a data object stored within memory of another node.

9. The method according to claim 5, wherein the group service process synchronizes access to and sharing of data structures between application processes on different nodes.

10. The method according to claim 5, wherein accessing data includes querying a mapping service process with the data object name in order to retrieve the data object handle associated with the data object name.

11. The method according to claim 5, wherein accessing data includes determining ownership of the data object and requesting transfer of the ownership of the data object to a process on the second node.

12. The method according to claim 1, wherein associating the application processes with an application group includes:
    registering the application as a group; and
    establishing a group service process on one of the nodes, wherein the group service process tracks membership of processes in groups.

13. The method according to claim 12, wherein accessing data within the data object includes obtaining a coherency state for the data object, wherein obtaining a coherency state includes accessing the group service process via the data object handle.

14. An article comprising a computer readable medium having instructions thereon, wherein the instructions, when executed in a computer, create a system for executing the method of claim 12.

15. The method according to claim 1, wherein associating the processes with an application group includes establishing a group service process on each of the nodes, wherein the group service process on each node tracks membership in groups of processes local to its respective node.

16. The method according to claim 15, wherein each group service process tracks formation of a process group, joining of local processes to the process group and exit of local processes from the process group.

17. The method according to claim 15, wherein the group service process executing on the first node differentiates between accesses to a data object stored within memory of the first node and accesses to a data object stored within memory of another node.

18. The method according to claim 15, wherein each data object is owned by a owner process and wherein the group service process of the node where the owner process executes synchronizes access to and sharing of its respective data object between processes on different nodes.

19. The method according to claim 15, wherein accessing data within the data object includes obtaining a coherency state for the data object wherein obtaining a coherency state includes accessing, via the data object handle, the group service process local to the node of the process seeking access to the data object.

20. The method according to claim 15, wherein accessing data includes querying a mapping service process with the data object name in order to retrieve the data object handle associated with the data object name.

21. The method according to claim 15, wherein accessing data includes querying a mapping service process with the data object name in order to retrieve the data object handle associated with the data object name and querying one or more group service processes with the data object handle in order to access the data object.

22. An article comprising a computer readable medium having instructions thereon, wherein the instructions, when executed in a computer, create a system for executing the method of claim 15.

23. The method according to claim 1, wherein mapping the name to a data object handle includes establishing a mapping service process on one of the nodes.

24. The method according to claim 1, wherein accessing data within the data object includes obtaining a coherency state for the data object via the data object handle.

25. The method according to claim 1, wherein mapping the name to a data object handle includes exporting the data object handle to a local group service process.

26. The method according to claim 25, wherein exporting includes accumulating two or more data object handles and exporting the two or more data object handles to the local group service process with a single export call, wherein the two or more data object handles are grouped in a vector within the export call.

27. The method according to claim 1, wherein allocating memory for the data object includes dividing a data structure into a number of data objects, wherein the number is a function of the type of application being executed.

28. The method according to claim 27, wherein mapping the name to a data object handle includes exporting the data object handle associated with each data object to a local group service process.

29. The method according to claim 28, wherein each data object has a data object size that is the smallest unit of update of the data object.

30. The method according to claim 1, wherein associating the processes with a group includes registering the application as a group and joining the processes to the group.

31. An article comprising a computer readable medium having instructions thereon, wherein the instructions, when executed in a computer, create a system for executing the method of claim 1.

32. A method for ensuring consistency in shared data within a distributed computing system having a plurality of nodes, wherein each node includes a processor and memory, the method comprising:
    distributing an application across two or more nodes, including a first node, wherein distributing the application includes creating processes, associating the processes with a group and distributing the processes to the two or more nodes;
    establishing a data object in memory of the first node, wherein establishing a data object includes allocating memory for the data object and assigning a name to the data object;
    making the data object available to processes associated with the group, wherein making the data object available to processes associated with the group includes:
        setting a data sharing policy for the data object;
        mapping the data object name to a data object handle; and assigning a data length to the data object representative of the memory allocated to the data object;

returning the data object handle to a process associated with the group in response to a request from the process based on the data object name; and accessing data stored in the data object through references to the data object handle.

33. The method according to claim 32, wherein associating the processes with a group includes:

registering the application as a group;

establishing a group service process on one or more of the nodes, wherein the group service process tracks membership of processes in groups; and establishing a mapping process on one of the nodes, wherein the mapping process provides the data object handle and the data length to processes associated with the group in response to a request based on the data object name.

34. An article comprising a computer readable medium having instructions thereon, wherein the instructions, when executed in a computer, create a system for executing the method of claim 32.

35. A method for ensuring consistency in shared data within a distributed computing system having a plurality of nodes, wherein each node includes a processor and memory, the method comprising:

distributing an application across two or more nodes, including a first node and a second node, wherein distributing the application includes creating processes associated with the application and distributing the processes to the two or more nodes;

establishing a data object in memory on the first node, wherein establishing a data object includes allocating memory for the data object and assigning a data object name to the data object;

mapping the data object name to a data object handle, wherein mapping includes exporting the data object handle to a local service process executing on the first node;

returning the data object handle to a process associated with the group running on the second node in response to a request from the process based on the data object name; and accessing the data object on the first node from the second node through references to the data object handle, wherein accessing the data object includes querying the local service process with the data object handle.

36. The method according to claim 35, wherein exporting includes accumulating two or more data object handles and exporting the two or more data object handles to the local group service process with a single export call, wherein the two or more data object handles are grouped in a vector within the export call.

37. An article comprising a computer readable medium having instructions thereon, wherein the instructions, when executed in a computer, create a system for executing the method of claim 35.

38. A method for ensuring consistency in shared data within a distributed computing system having a plurality of nodes, wherein each node includes a processor and memory, the method comprising:

distributing a first application across two or more nodes, including a first node and a second node, wherein distributing the application includes creating processes, associating the processes with a first process group and distributing the processes to the two or more nodes;

establishing a group service process, wherein the group service process tracks processes joining and leaving the first process group;

establishing a data object in memory on the first node, wherein establishing a data object includes assigning a name to the data object, setting a data sharing policy for the data object, and determining a data length associated with the data object;

making the data object available to the processes on the two or more nodes that are associated with the first process group, wherein making the data object available includes assigning a data object handle to the data object;

returning the data object handle to a process on the second node in response to a request based on the data object name; and accessing the data object from the second node through references to the data object handle.

39. The method according to claim 38, wherein accessing the data object includes obtaining information on ownership of the data object and a coherency state for data within the data object.

40. The method according to claim 38, wherein associating the processes with a first process group includes:

registering the first application as a group; and establishing a group service process on one of the nodes, wherein the group service process tracks membership of processes in groups; and wherein assigning a data object handle to the data object includes establishing a mapping process on one of the nodes, wherein the mapping process returns a unique data object handle for each data object.

41. An article comprising a computer readable medium having instructions thereon, wherein the instructions, when executed in a computer, create a system for executing the method of claim 38.

42. A method for ensuring consistency in shared data within a distributed computing system having a plurality of nodes, wherein each node includes a processor and memory, the method comprising:

distributing a first application across two or more nodes, including a first node, wherein distributing the application includes creating processes, associating the processes with a first process group and distributing the processes to the two or more nodes;

establishing a local group service process on each node, wherein each local group service process tracks processes joining and leaving the first process group from that node;

establishing a data object in memory on the first node, wherein establishing a data object includes allocating memory for the data object, assigning a name to the data object and setting a data sharing policy for the data object;

assigning a data object handle to the data object, wherein the data object handle includes information regarding the data sharing policy and a memory size label representative of memory allocated for the data object, wherein assigning includes recording the data object name and the data object handle so that the data object handle can subsequently be determined from the data object name;

exporting the data object handle to the local group service process executing on the first node;

returning the data object handle to a process on the second node in response to a request based on the data object name; and accessing the data object from the second node through references to the data object handle.

43. The method according to claim 42, wherein associating the processes with a first process group includes:
   registering the first application as a group;
   establishing a group service process on one of the nodes, wherein the group service process tracks membership of processes in groups; and
   establishing a mapping process on one of the nodes, wherein the mapping process provides a unique data object handle to be assigned to the data object.

44. An article comprising a computer readable medium having instructions thereon, wherein the instructions, when executed in a computer, create a system for executing the method of claim 42.

45. A distributed computing system, comprising:
   a plurality of intercommunicating nodes, wherein each node includes a processor and memory;
   means for distributing an application as processes running on two or more nodes, wherein the means for distributing includes a group service process running on one of the nodes, wherein the group service process tracks processes joining and leaving a process group associated with the application;
   means for exporting a data object associated with the application to processes within the process group, wherein the means for exporting includes means for assigning a data object handle to the data object, wherein the data object handle uniquely identifies the data object;
   means for returning the data object handle to a process running on one of the two or more nodes in response to a request for the data object based on the data object name; and
   means for accessing the data object from a process running on a remote node through references to the data object handle;
   wherein the data object handle is used to obtain a coherency state of the data object for processes within the process group.

46. The system according to claim 45, wherein the system further includes means for accessing data within the data object, wherein the means for accessing data includes means for obtaining a coherency state for the data object.

47. The system according to claim 45, wherein the group service process tracks group memberships of processes local to its respective node.

48. The system according to claim 47, wherein each node includes means for multicasting to the other nodes a request to identify who owns the data object.

49. A distributed computing system, comprising:
   a plurality of intercommunicating nodes, wherein each node includes a processor and memory;
   means for distributing an application as application processes running on two or more nodes, wherein the means for distributing includes a group service process running on two or more of the nodes, wherein the group service processes track application processes joining and leaving a process group associated with the application;
   means for making a data object associated with the application available to processes within the process group, wherein the means for making a data object associated with the application available to processes within the process group includes means for assigning a data object handle to the data object and means for writing the data object handle to one of the group service processes, wherein the data object handle uniquely identifies the data object;
   means for returning the data object handle to a process running on one of the two or more nodes in response to a request for the data object based on the data object name; and
   means for accessing the data object from a process running on a remote node through references to the data object handle;
   wherein the application processes use the data object handle to access data within the data object from application processes running on other nodes in the process group.

50. The system according to claim 49, wherein the system further includes means for obtaining a coherency state associated with the data object handle.

51. The system according to claim 49, wherein the group service process tracks group memberships of processes local to its respective node.

52. The system according to claim 51, wherein each node includes means for multicasting to the other nodes a request to identify who owns the data object.

53. A computing system for executing a distributed application, the computing system comprising:
   a plurality of intercommunicating nodes, wherein each node includes a processor and memory, wherein one of the memories includes a data object, wherein the data object has a data object name;
   a mapping process executing on one of the plurality of nodes, wherein the mapping process maps the data object name to a unique data object handle, wherein the mapping process returns the data object handle in response to a request based on the data object name from a process running on a node remote from the node where the data object is stored; and
   a group service process operating on each node, wherein the group service process tracks processes local to its node as they join and leave a process group associated with the distributed application and wherein the group service process responds to requests from remote nodes, based on the data object handle, for access to the data object associated with the data object handle.

54. The computing system of claim 53, wherein the data object handle is used to obtain a coherency state of the data object for processes within the process group.

55. The computing system according to claim 53, wherein the system further includes means for accessing data within the data object, wherein the means for accessing data includes means for obtaining a coherency state for the data object.

56. The system according to claim 53, wherein each node includes means for multicasting to the other nodes a request to identify who owns the data object.

57. A method for ensuring consistency in shared data within a distributed computing system having a plurality of nodes, wherein each node includes a processor and memory, the method comprising:
   distributing an application across two or more nodes, including a first node, wherein distributing the application includes creating processes, associating the processes with a group and distributing the processes to the two or more nodes;
   establishing a first and a second data object in memory on the first node, wherein establishing each data object includes assigning a name to each data object and allocating memory for each data object;
   setting a data sharing policy for each data object;

mapping the first and second data object names to first and second data object handles, respectively;

exporting the first and second data objects;

returning the first data object handle in response to a request based on the first data object name, wherein returning the first data object handle includes returning information regarding data sharing policy and data object size for the first data object; and accessing the first data object from a remote node using the first data object handle.

58. The method according to claim 57, wherein accessing the first data object using the first data object handle includes obtaining a coherency state for the first data object through a reference to the first data object handle.

59. The method according to claim 57, wherein exporting the first and second data objects includes calling an API having a data object handle vector and a count, wherein the API writes the data object handles in the data object handle vector to a local group service process.

60. A router, comprising:

a plurality of router nodes, wherein each router node communicates with the other router nodes and wherein each router node includes a route processor and memory, wherein the memory includes a data object and wherein the data object has a name;

a mapping process executing on one of the plurality of nodes, wherein the mapping process maps the data object name to a unique data object handle, wherein the mapping process returns the data object handle in response to a request based on the data object name from a process running on a node remote from the node where the data object is stored; and a group service process operating on each node, wherein the group service process tracks processes local to its node as they join and leave a process group associated with the distributed application and wherein the group service process responds to requests from remote nodes, based on the data object handle, for access to the data object associated with the data object handle.

61. The router according to claim 60, wherein the data object handle is used to obtain a coherency state of the data object for processes within the process group.

62. The router according to claim 60, wherein the router further includes means for accessing data within the data object, wherein the means for accessing data includes means for obtaining a coherency state associated with the data object.

63. The router according to claim 60, wherein each node includes means for multicasting to the other nodes a request to identify who owns the data object.

* * * * *

UNITED STATES PATENT AND TRADEMARK OFFICE
CERTIFICATE OF CORRECTION

PATENT NO. : 7,162,476 B1
APPLICATION NO. : 10/660380
DATED : January 9, 2007
INVENTOR(S) : Belair et al.

It is certified that error appears in the above-identified patent and that said Letters Patent is hereby corrected as shown below:

On the title page, item (73), in "Assignee", in column 1, line 1, delete "Inc," and insert -- Inc., --, therefor.

In column 3, line 54, delete "an" and insert -- a --, therefor.

In column 3, line 56, delete "H+ L." and insert -- H+L. --, therefor.

In column 3, line 57, delete "H+ L)" and insert -- H+L) --, therefor.

In column 4, line 38, after "range" insert -- . --.

In column 4, line 52, delete "H+ L)." and insert -- H+L). --, therefor.

In column 4, line 54, delete "H+ L)" and insert -- H+L) --, therefor.

In column 13, line 40, delete "requester." and insert -- requestor. --, therefor.

In column 13, line 48, delete "requester" and insert -- requestor --, therefor.

Signed and Sealed this

First Day of July, 2008

JON W. DUDAS
*Director of the United States Patent and Trademark Office*